(12) United States Patent
Faik et al.

(10) Patent No.: US 10,696,578 B2
(45) Date of Patent: Jun. 30, 2020

(54) METHOD FOR FABRICATING A VEHICLE INTERIOR TRIM PART AND VEHICLE INTERIOR TRIM PART

(71) Applicant: Faurecia Innenraum Systeme GmbH, Hagenbach (DE)

(72) Inventors: Othmane Faik, La Wantzeanu (FR); Stephen Bellagamba, Strasbourg (FR)

(73) Assignee: FAURECIA INNENRAUM SYSTEME GMBH, Hagenbach (DE)

(*) Notice: Subject to any disclaimer, the term of this patent is extended or adjusted under 35 U.S.C. 154(b) by 219 days.

(21) Appl. No.: 15/680,185

(22) Filed: Aug. 17, 2017

(65) Prior Publication Data
US 2018/0050948 A1    Feb. 22, 2018

(30) Foreign Application Priority Data

Aug. 18, 2016  (DE) .................. 10 2016 215 546

(51) Int. Cl.
| | | |
|---|---|---|
| *C03B 23/00* | (2006.01) | |
| *B60K 37/06* | (2006.01) | |
| *C03B 23/023* | (2006.01) | |
| *B60K 35/00* | (2006.01) | |

(52) U.S. Cl.
CPC .......... *C03B 23/0066* (2013.01); *B60K 35/00* (2013.01); *B60K 37/06* (2013.01); *C03B 23/023* (2013.01); *B60K 2370/1446* (2019.05); *B60K 2370/175* (2019.05); *B60K 2370/197* (2019.05);
(Continued)

(58) Field of Classification Search
None
See application file for complete search history.

(56) References Cited

U.S. PATENT DOCUMENTS

| | | | |
|---|---|---|---|
| 8,202,616 B2 | 6/2012 | Suzuki et al. | |
| 10,065,576 B2 | 9/2018 | Faik et al. | |
| 10,328,871 B2 | 6/2019 | Faik et al. | |

(Continued)

FOREIGN PATENT DOCUMENTS

| | | |
|---|---|---|
| DE | 19928235 A1 | 4/2000 |
| DE | 2006002835 U1 | 9/2006 |

(Continued)

OTHER PUBLICATIONS

Extended European Search Report issued in EP Application No. 18175285.8 [with Google machine translation], completed Oct. 17, 2018, 14 pages.
(Continued)

*Primary Examiner* — Cynthia Szewczyk
(74) *Attorney, Agent, or Firm* — Faegre Drinker Biddle & Reath LLP

(57) ABSTRACT

The present application relates to a method for fabricating a vehicle interior trim part. The proposed method comprises the step of providing a glass panel with a backside and a first and a second region. In a further step, a first stiffener is attached to the first region of the glass panel. Thereby, a stiffened region of the glass panel is formed. The method further comprises the step of bending the second region of the glass panel by cold forming so that a bent region of the glass panel is formed in a region adjacent to the stiffened region. The method further comprises the step of holding the glass panel in shape using a means of fixation.

10 Claims, 3 Drawing Sheets

(52) U.S. Cl.
CPC .. *B60K 2370/741* (2019.05); *B60K 2370/782* (2019.05)

(56) References Cited

U.S. PATENT DOCUMENTS

| | | |
|---|---|---|
| 2005/0003148 A1 | 1/2005 | Myles et al. |
| 2009/0201436 A1 | 8/2009 | Strazzanti |
| 2009/0268278 A1 | 10/2009 | Suzuki et al. |
| 2010/0144980 A1 | 6/2010 | Fujibayshi et al. |
| 2011/0287230 A1 | 11/2011 | Akuzawa et al. |
| 2014/0050886 A1 | 2/2014 | Burgin et al. |
| 2015/0291085 A1 | 10/2015 | Manning |
| 2015/0321434 A1 | 11/2015 | Sterman et al. |
| 2016/0229991 A1 | 8/2016 | Diaz et al. |
| 2016/0280128 A1 | 9/2016 | Cannon |
| 2016/0375843 A1 | 12/2016 | Faik et al. |
| 2018/0345879 A1 | 12/2018 | Chapeau et al. |
| 2019/0039935 A1* | 2/2019 | Couillard ............ C03B 23/0305 |

FOREIGN PATENT DOCUMENTS

| | | |
|---|---|---|
| DE | 102013214108 A1 | 2/2015 |
| DE | 102014107098 A1 | 11/2015 |
| DE | 102014011230 A1 | 1/2016 |
| DE | 102015105694 A | 10/2016 |
| EP | 1305189 B1 | 5/2003 |
| WO | WO02057374 A1 | 7/2002 |
| WO | WO2015188017 A1 | 12/2015 |
| WO | 2016024029 A1 | 2/2016 |

OTHER PUBLICATIONS

German Search Report issued in DE Application No. 10 2017 209457.5 [with Google machine translation], dated Apr. 19, 2018, 20 pages.

* cited by examiner

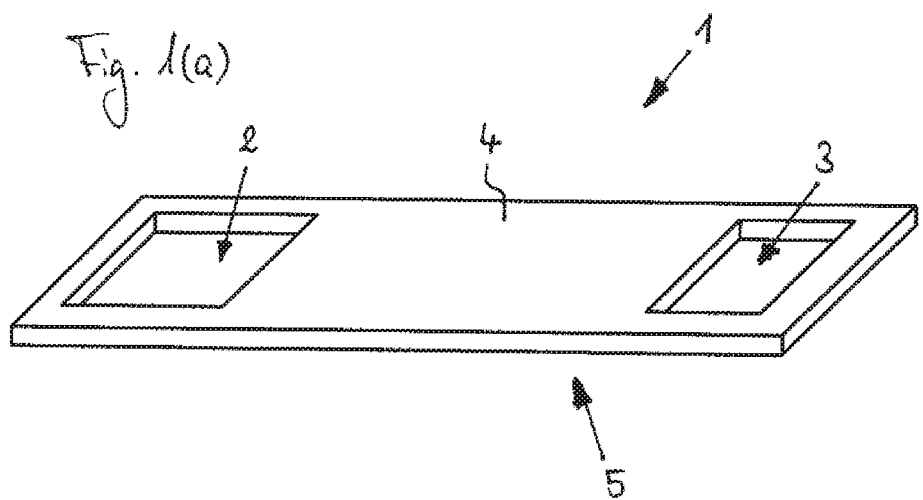
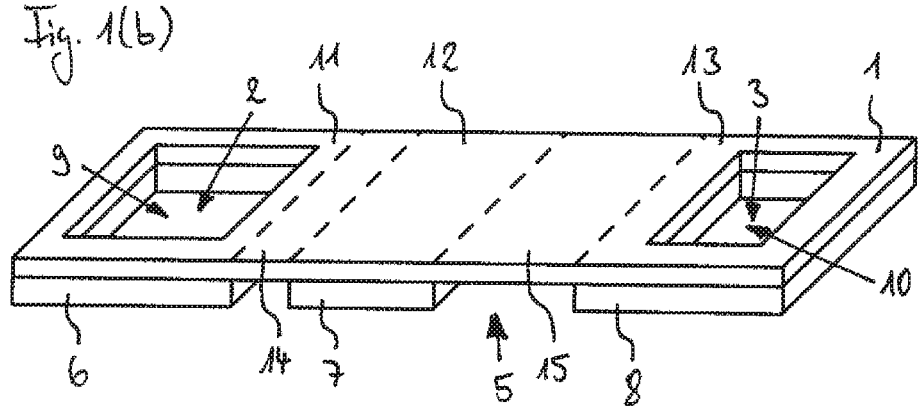
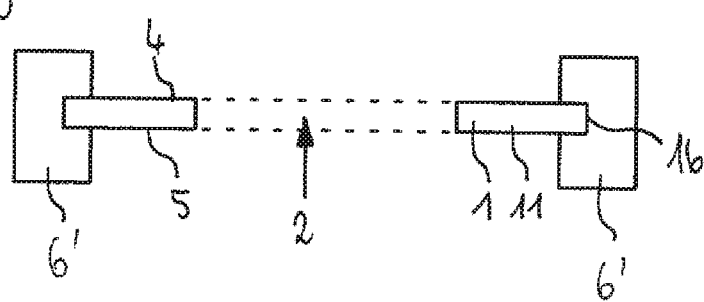

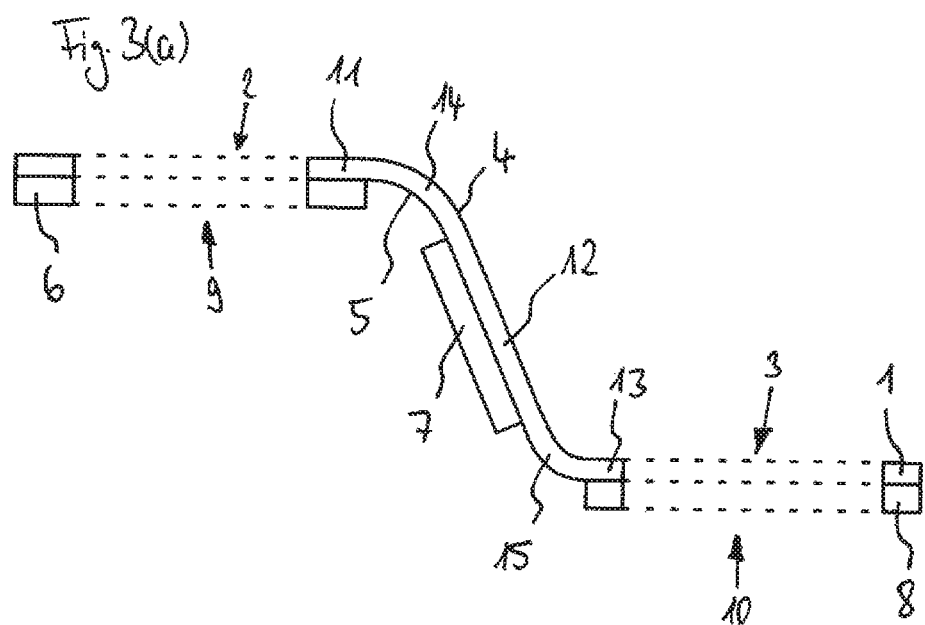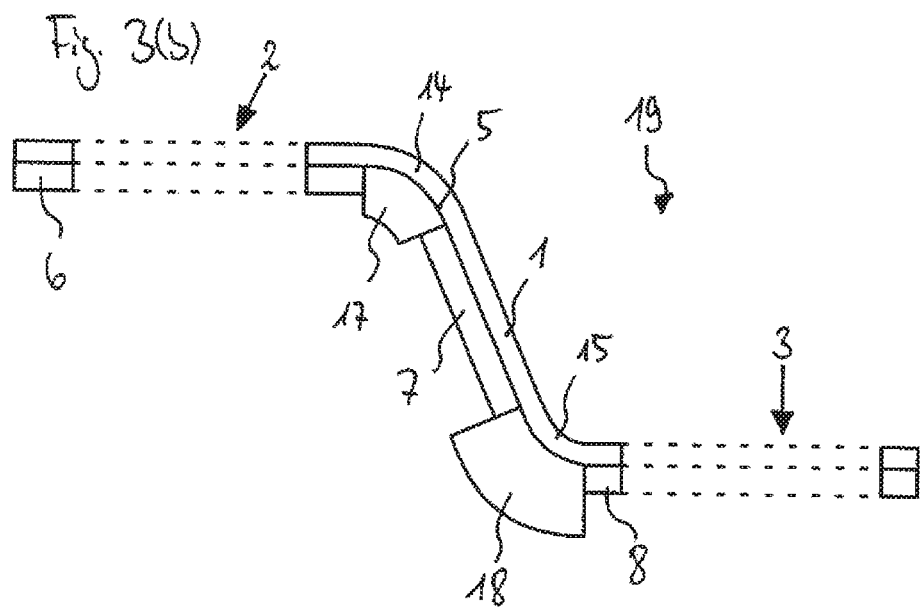

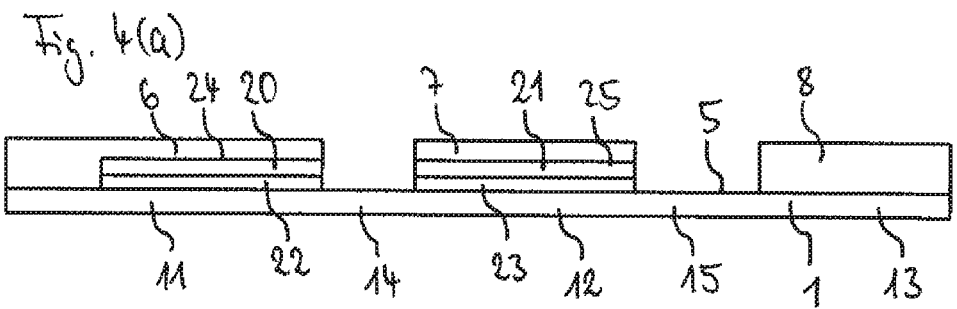
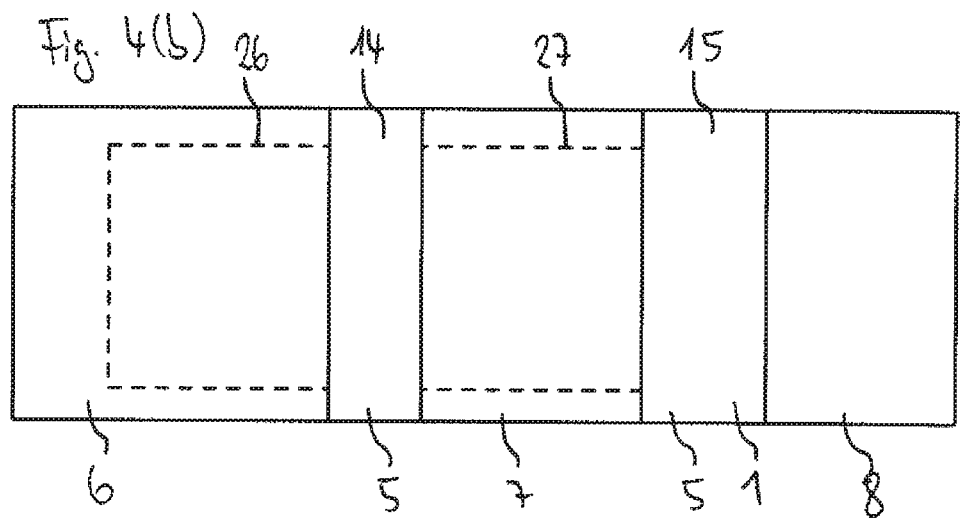
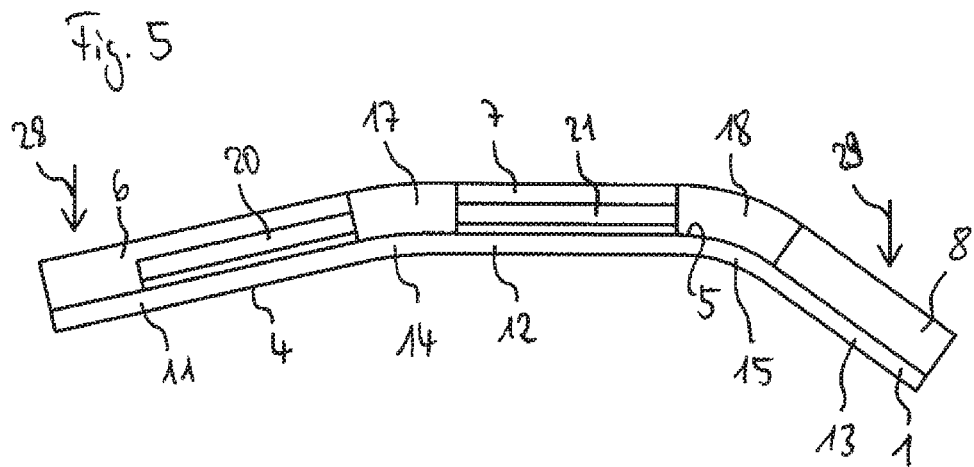

METHOD FOR FABRICATING A VEHICLE INTERIOR TRIM PART AND VEHICLE INTERIOR TRIM PART

CROSS-REFERENCE TO RELATED APPLICATION

This application claims priority to German Application No. 10 2016 215 546.6, filed Aug. 18, 2016, which is herein incorporated by reference in its entirety.

TECHNICAL FIELD

The application relates to a method for fabricating a vehicle interior trim part. In addition, the application relates to a vehicle interior trim part.

BACKGROUND

It is known to use glass panels in vehicle interiors, for example as a mirror or as instrument glass. Glass is known for its high-quality optical and haptic appearance. Further, displays are commonly installed in vehicle interiors to provide a driver or a passenger with information. In some applications, a display may be arranged behind an optically transparent glass panel, e.g., to protect the display from food or beverage spills or from scratches.

Further, curved glass panels are used in various applications. Curved glass panels may be formed by first heating a glass panel to a temperature above the softening point of the glass panel. Subsequently the glass panel may be deformed by either actively bending the glass panel using a bending device or by letting the glass bend due to its own weight. Alternatively, cold forming processes may be used when bending glass panels. These processes are known to consume less energy and time. In a cold forming process, a glass panel is typically bent at room temperature on a curved frame. After bending the glass panel, e.g., when a curvature of the glass panel corresponds to a curvature of the curved frame, the glass panel is strained and tends to gradually take back its initial shape. Therefore, the bent glass panel typically needs to be mechanically fixed to the curved frame after bending to retain the curvature of the glass panel.

For example, document DE 10 2013 214 108 A1 relates to a method for the production of a bent, translucent molded glass part, especially a disc-shaped cover for a vehicle dashboard, wherein the production process for shaping of the glass part is simplified. A multitude of flexible, anorganic glass films are layered with an interposition of an adhesive layer between the glass films. In a molding tool the glass layers are compressed and held at a temperature below a glass transition temperature until the adhesive is cured such that a self-supporting molded glass part is formed.

When a glass panel comprising a functional element such as a display is bent, problems may occur relating to the strain exerted on a bonding interface between the functional element and the glass panel or on the functional element itself by the bending process. Consequently, a detachment or breakage of the functional element may occur. Similar problems may occur when a glass panel comprises a hole for receiving a functional element such as a display, an air vent, or a rotary knob. The panel is weakened due to the hole, and the stress in the panel around the hole may exceed critical values with the consequence of unwanted deformation or even breakage.

SUMMARY

In view of the aforementioned aspects, it is an object of the present application to suggest a method for fabrication of a vehicle interior panel which helps overcome the above-mentioned disadvantages. In particular, it is an object of the present application to suggest a method of fabrication which allows for a secure connection between one or more functional elements and a bent glass panel, while reducing the risk of breakage of the glass panel or the functional element. In addition, it is an object of the present application to provide a similarly advantageous vehicle interior panel.

These objectives are achieved by a method with the steps of the independent claim 1 and by a vehicle interior panel with the features of another independent claim. Optional further features and further developments will become apparent from the dependent claims and the detailed description in conjunction with the accompanying drawings.

The proposed method for fabricating a vehicle interior trim part comprises the step of providing a glass panel with a backside and a first region and a second region. In a further step, a stiffener is attached to the first region of the glass panel, e.g., to the backside of the glass panel. Thereby, a stiffened region of the glass panel is formed. The method further comprises the step of bending the second region of the glass panel by cold forming so that a bent region of the glass panel is formed in a region adjacent to the stiffened region. The method further comprises the step of holding the glass panel in shape using a means of fixation.

The glass panel is typically flat before the cold bending process, although it might be bent. The stiffener ensures that the stiffened region remains in its shape, typically in a flat shape, during the bending process. Hence, the stiffened region is suited for the attachment of functional elements which benefit from a surface with a shape which is adapted to the element. For example, the functional element may be a flat display. The functional element may be attached to the stiffened region prior to bending the glass panel or after bending the glass panel. If the functional element is attached to the stiffened region prior to bending the glass panel, the suggested method may prevent detachment of the functional element and breakage of the functional element during the bending process. For example, the display may be attached to the backside of the glass panel in a region which corresponds to the stiffened region. In this embodiment, the glass panel is at least partially optically transparent. The display may be attached to the backside of the glass panel before bending the glass panel.

The suggested cold forming process is typically fast and energy efficient and therefore helps to reduce costs of production. The cold forming process is typically performed at room temperature and/or below the glass softening point. If functional elements are attached to the glass panel prior to bending, the temperature may not exceed the degradation temperature of the functional elements.

The glass panel needs to be held in shape to prevent the cold formed glass panel from regaining its initial shape due to the strain generated in the glass panel by the bending process. The means of fixation may be a keystone stiffener. The keystone stiffener may have a surface with a curvature radius corresponding to a curvature radius of the backside of the glass panel in the bent region. Further, the step of holding the glass panel in shape may comprise the step of arranging the keystone stiffener with its surface on the backside of the glass panel in the bent region. In addition, the step of holding the glass panel in shape may comprise she step of attaching the keystone stiffener to the stiffener.

After bending, the radius of curvature of the backside of the glass panel may amount to typically a few millimeters or centimeters. For slightly bent panels, the radius of curvature may be much larger.

In some embodiments, the step of holding the glass panel in shape may comprise the step of attaching the keystone stiffener to the glass panel in the bent region. The stiffener may be removed in a further step. The cold formed glass panel may then be held in shape by the keystone stiffener.

The present application further relates to the vehicle interior trim part. The vehicle interior trim part comprises the cold formed glass panel and the stiffener. The stiffener is attached to the glass panel, e.g., to the backside of the glass panel, thereby forming the stiffened region of the glass panel. The glass panel comprises the bent region adjacent to the stiffened region. The vehicle interior trim panel further comprises the keystone stiffener, which has the surface with the curvature radius corresponding to the curvature radius of the backside of the glass panel in the bent region. The keystone stiffener is attached to the stiffener so that the glass panel is held in shape by the keystone stiffener and the stiffener. The vehicle interior trim part may comprise the display, which is attached to the backside of the glass panel in a region which corresponds to the stiffened region. A front side of the glass panel typically faces a vehicle interior. The front side of the glass panel typically forms a visible side of the vehicle interior trim part, when the vehicle interior trim part is installed in a vehicle.

In some embodiments, a second stiffener may be attached to the glass panel, e.g., to the backside of the glass panel. Thereby, a second stiffened region of the glass panel may be formed. Typically, the second stiffened region does not overlap with the first stiffened region. The bent region is typically formed between the first stiffened region and the second stiffened region.

The keystone stiffener may be attached to the second stiffener after the keystone stiffener is arranged on the backside of the glass panel.

The first stiffener and/or the second stiffener may at least partially surround a region of the glass panel. In particular, this region of the glass panel may comprise a hole and/or a functional element, for example a display. The first stiffener and/or the second stiffener may be a frame with an opening, particularly a blind hole, a through hole or a groove, configured to receive a display or other functional element. In further embodiments the first stiffener and/or the second stiffener may be simply connected.

Further, the sole stiffener and/or any additional stiffener may be a plate or a frame. The plate or frame may at least partially cover a backside of the glass panel and/or a backside of the functional element, e.g., the display, which may be attached to the backside of the glass panel or inside a hole of the glass panel. In some embodiments the stiffener partially encompasses an edge region of the glass panel, so that it contacts the front side and the back side of the glass panel.

In addition, the glass panel may comprise an opening in a region corresponding to the first stiffened region. The glass panel may further comprise an opening in a region corresponding to the second stiffened region. The opening of the glass panel in the first and/or the second region may be suited for receiving a functional module, such as an air vent and/or a trash can.

For example, the stiffener and/or the keystone stiffener may be glued to the backside of the glass panel. The stiffener and/or the second stiffener may at least partially surround the opening. The stiffener and/or the second stiffener may be a frame with an opening and may be configured to surround the opening of the glass panel.

A bending device may be removed after the step of holding the glass panel in shape, wherein the step of bending the glass panel by cold forming may be performed using the bending device.

The first stiffener, the second stiffener, and the keystone stiffener are rigid. The first stiffener, the second stiffener, and/or the keystone stiffener may contain a metal and/or a fibre reinforced plastic. For example, the first stiffener, the second stiffener, and/or the keystone stiffener may contain Aluminum.

The glass panel may comprise soda lime and/or aluminosilicate. The glass panel may be chemically and/or thermally strengthened. A thickness of the glass panel may be at least 0.01 mm and/or at most 2 mm.

The first stiffener, the second stiffener, or any other stiffener may be a flat stiffener. The first stiffener, the second stiffener, or any other stiffener may have a flat surface. The first stiffener, the second stiffener, or any other stiffener may be attached to the backside of the glass panel with a flat surface of the stiffener.

The vehicle interior panel may be particularly suited for forming a trim part covering the display and further covering the air vent and/or the trash can. For this purpose, the vehicle interior panel may comprise the second stiffener, which is attached to the backside of the glass panel. Thereby a second stiffened region of the glass panel may be formed. The second stiffened region may not overlap with the first stiffened region. Further, the bent region may be formed between the stiffened region and the second stiffened region. The glass panel may comprise the opening in the second stiffened region.

BRIEF DESCRIPTION OF THE DRAWINGS

Exemplary embodiments will be described in conjunction with the following figures.

FIG. 1(a) shows a perspective view of a glass panel before a cold forming process, FIG. 1(b) shows a perspective view of the glass panel and stiffeners attached to a backside of the glass panel, FIG. 2 shows a sectional view of an alternative embodiment of a stiffener, FIG. 3(a) shows a sectional view of the glass panel and the stiffeners after the cold forming process, FIG. 3(b) shows a sectional view of the glass panel, the stiffeners and keystone stiffeners, FIG. 4(a) shows a sectional view of another glass panel with displays and stiffeners, FIG. 4(b) shows a top view of the glass panel, and FIG. 5 shows a sectional view of the glass panel after a bending process.

DETAILED DESCRIPTION

FIG. 1(a) illustrates a first step of a method for fabrication of a vehicle interior trim part. The figure shows a flat and optically transparent glass panel 1 comprising two openings 2, 3. The openings 2, 3 connect a front side 4 of the glass panel 1 with a backside 5 of the glass panel 1. For example, a thickness of the glass panel 1 may amount to 0.5 mm. The glass panel 1 may consist of aluminosilicate glass. The depicted glass panel 1 has a rectangular shape. Other shapes are possible, however.

FIG. 1(b) shows the glass panel 1 after three stiffeners 6, 7, 8 have been attached to sections of the backside 5 of the glass panel 1. Corresponding features shown in FIG. 1(b) and the following figures are denoted using the same reference numerals. In this embodiment, the stiffeners are flat stiffeners having a flat surface corresponding to the flat backside of the glass panel. The stiffeners 6, 7, 8 each have a flat surface which lies flat against the backside 5 of the glass panel 1. The stiffeners 6, 7, 8 may be glued to the backside 5 of the glass panel 1. Alternatively, the stiffeners 6, 7, 8 may be attached to the glass panel 1 by other means, e.g., by clamping.

Two of the stiffeners 6, 8 frame the openings 2, 3 of the glass panel 1. Openings 9, 10 of the two stiffeners 6, 8 overlap with the openings 2, 3 of the glass panel 1. The other stiffener 7 does not have an opening. This stiffener 7 is arranged between the other stiffeners 6, 8.

The stiffeners 6, 7, 8 may contain or consist of a metal, for example Aluminum. The stiffeners 6, 7, 8 may also contain strong fibres, for example carbon fibres and/or a plastic material. Therefore, the stiffeners 6, 7, 8 are rigid. The stiffeners 6, 7, 8 are spaced apart so that separated stiffened regions 11, 12, 13 of the glass panel 1 are formed. In between the stiffened regions 11, 12, 13 further regions 14, 15 of the glass panel 1 are formed. These regions 14, 15 are not stiffened by the stiffeners 6, 7, 8. The different regions 11, 12, 13, 14, 15 of the glass panel 1 are indicated in FIG. 1(b) using dashed lines.

Another possible embodiment of the stiffener 6' is shown in the sectional view of FIG. 2. Like the stiffener 6 described above, the other embodiment of the stiffener 6' forms the stiffened region 11 of the glass panel 1. This stiffener 6' forms a frame and encompasses an edge 16 of the glass panel 1 and contacts the front side 4 and the backside 5 of the glass panel 1.

In a further step, the glass panel 1 is bent in the regions 14, 15 between the stiffeners using a cold forming process. Bending of the glass panel 1 may be performed at room temperature, for example. Bending of the glass panel 1 may be performed using a bending device known from the art.

Due to the stiffeners 6, 7, 8 the stiffened regions 11, 12, 13 of the glass panel 1 are not bend during the cold forming process as shown in FIG. 3(a). Therefore, the glass panel 1 retains its shape, typically a flat shape, in these regions 11, 12, 13. However, in the regions 14, 15 in between the stiffened regions 11, 12, 13 the glass panel 1 is bent. In these bent regions 14, 15 the backside 5 of the glass panel 1 exhibits a radius of curvature. The radius of curvature may amount to, e.g., a few millimeters or centimeters.

In a next step, two keystone stiffeners 17, 18 are provided as shown in FIG. 3(b). The keystone stiffeners 17, 18 are rigid and typically contain a metal such as Aluminum. The keystone stiffeners each 17, 18 have a surface with a radius of curvature which corresponds to the radius of curvature of the backside 5 of the glass panel 1 in one of the bent regions 14, 15 of the glass panel 1. The keystone stiffeners 17, 18 are each arranged on the backside 5 of the glass panel 1 in one of the bent regions 14, 15 of the glass panel 1 such that the surfaces of the keystone stiffeners 17, 18 lie flat against the backside 5 of the glass panel 1 in the bent regions 14, 15. The keystone stiffeners 17, 18 fill in gaps between the stiffeners 6, 7, 8. Preferably, the keystone stiffeners are made out of metal, but they may also be made out of ceramic or a mechanically strong plastic, for example a fibre reinforced plastic.

In a further step, the keystone stiffeners 17, 18 may be attached to the stiffeners 6, 7, 8, e.g., using screws or adhesive, so that the glass panel 1 is held in shape by the stiffeners 6, 7, 8, 17, 18. Afterwards, the bending device may be removed.

In some embodiments, the keystone stiffeners 17, 18 may be attached to the glass panel 1, in particular to the backside 5 of the glass panel 1, before the bending device is removed, e.g., by glueing or by clamping. In these embodiments, the glass panel 1 may be held in shape by the keystone stiffeners 17, 18 alone, and the stiffeners 6, 7, 8 may be removed in a next step.

A display, which is not depicted in any of FIGS. 1(a) to 3(b) may be bonded to the backside 5 of the glass panel 1. In some embodiments, the display is bonded to the backside 5 of the glass panel 1 in the stiffened region 12 before bending the glass panel 1. However, the display may also be bonded to the backside 5 of the glass panel 1 after bending of the glass panel, where applicable, after removal of the stiffeners 6, 7, 8 or one of the stiffeners 7.

When the vehicle interior trim part is installed in a vehicle, the front side 4 of the glass panel 1 typically faces a vehicle interior 19. In some embodiments, an air vent may be installed on the backside 5 of the glass panel 1 such that the air vent overlaps with the opening 2 of the glass panel 1. Further, a trash can may be installed on the backside 5 of the glass panel 1 such that an opening of the trash can overlaps with the opening 3 of the glass panel 1.

Another process for fabrication of a vehicle interior trim part is depicted in the following figures. FIG. 4(a) shows the glass panel 1 before the bending process. In this example, two functional elements, e.g., displays 20, 21, are bonded to the backside 5 of the glass panel 1 using a bonding means 22, 23. Further, the stiffeners 6, 7, 8 are glued to the backside 5 of the glass panel 1, so that the stiffened regions 11, 12, 13 of the glass panel 1 are formed. The regions 14, 15 of the glass panel 1 that are arranged between the stiffened regions 11, 12, 13 will form the bent regions of the glass panel 1.

Two of the stiffeners 6, 7 each cover a backside 24, 25 of one of the displays 20, 21. A top view onto the backside 5 of the glass panel 1 and onto the stiffeners 6, 7, 8 is shown in FIG. 4(b). The positions of the displays 20, 21 are outlined in this figure using dashed lines 26, 27. The stiffeners 6, 7 each partially surround one of the displays 20, 21.

In further step, the glass panel 1 is bent by cold forming. During the step, the bending device exerts a force onto the depicted structure, as schematically illustrated by arrows with numerals 28 and 29 in FIG. 5. As described above, the glass panel 1 is bent in the regions 14, 15 corresponding to the gaps between the stiffeners 6, 7, 8, while the glass panel 1 remains flat in the stiffened regions 11, 12, 13.

As explained above, after the bending process, the keystone frames 17, 18 are arranged on the backside 5 of the glass panel 1 to hold the glass panel 1 in shape. For this purpose, the keystone frames 17, 18 may be attached to the glass panel 1 and/or to the stiffeners 6, 7, 8. In a next step, the bending device may be removed.

In the embodiment shown in FIG. 5 the interior trim part comprises three stiffeners 6, 7, 8 which are attached to the backside 5 of the glass panel 1 in order to provide three stiffened regions 11, 12, 13 of the glass panel 1. The two bent regions 14, 15 of the glass panel 1 are adjacent and in between the stiffened regions 11, 12, 13. So, the three stiffened regions 11, 12, 13 are separated by the two bent regions 14, 15. The two keystone stiffeners, each having a curvature radius of the backside of the glass panel in the corresponding region, are attached to the stiffeners. The stiffeners and the keystone stiffeners hold the panel in its shape.

The embodiment of FIG. 5 further comprises the functional elements 20, 21 in the stiffened regions of the glass panel. A functional element may be a display, audio equipment or air conditioning means. Instead of comprising a functional element, the stiffened region may comprise a hole for venting or for a trash tray.

We claim:
1. A method for fabricating a vehicle interior trim part, characterized by the steps:
    providing a glass panel with a backside and a first and a second region,
    attaching a first stiffener to the first region of the glass panel, thereby forming a stiffened region of the glass panel,
    bending the second region of the glass panel by cold forming so that a bent region of the glass panel is formed in a region adjacent to the stiffened region, and
    holding the glass panel in shape using a means of fixation.
2. The method of claim 1, characterized by the step:
    attaching a second stiffener to a third region of the glass panel, thereby forming a second stiffened region of the glass panel,
    wherein the second stiffened region does not overlap with the first stiffened region, and
    wherein the bent region is formed between the first stiffened region and the second stiffened region.
3. The method of claim 2, characterized by the step:
    attaching a third stiffener to a fourth region of the glass panel, thereby forming a third stiffened region of the glass panel,
    wherein the third stiffened region does not overlap with the first stiffened region or the second stiffened region, and
    wherein a second bent region is formed between the third stiffened region and the second stiffened region.
4. The method of claim 1, characterized in that the means of fixation is a keystone stiffener, which has a surface with a curvature radius corresponding to a curvature radius of the backside of the glass panel in the bent region, and the step of holding the glass panel in shape comprises the following step:
    arranging the keystone stiffener with its surface on the backside of the glass panel in the bent region.
5. The method of claim 1, characterized by the step:
    attaching a display to the backside of the glass panel in a region which corresponds to a stiffened region.
6. The method of claim 1, characterized in that at least one of the stiffeners is a frame, which frame partially surrounds a region of the glass panel.
7. The method of claim 1, characterized in that at least one of the stiffeners is a plate or a frame which at least partially covers a backside of the glass panel and/or a backside of the display.
8. The method of claim 1, characterized in that the glass panel comprises an opening in a region corresponding to a stiffened region.
9. The method of claim 1, characterized by the step:
    removing a bending device after the step of holding the glass panel in shape, wherein the step of bending the glass panel by cold forming is performed using the bending device.
10. The method of claim 1, characterized in that the stiffener contains a metal or a fibre reinforced plastic.

* * * * *